(12) United States Patent
Visser

(10) Patent No.: US 8,079,573 B2
(45) Date of Patent: Dec. 20, 2011

(54) APPARATUS AND METHOD FOR AERATING WASTE WATER

(76) Inventor: Andries Visser, Oudega (NL)

(*) Notice: Subject to any disclaimer, the term of this patent is extended or adjusted under 35 U.S.C. 154(b) by 1118 days.

(21) Appl. No.: 11/791,773

(22) PCT Filed: Nov. 28, 2005

(86) PCT No.: PCT/NL2005/000815
§ 371 (c)(1),
(2), (4) Date: Sep. 27, 2007

(87) PCT Pub. No.: WO2006/057560
PCT Pub. Date: Jun. 1, 2006

(65) Prior Publication Data
US 2008/0053921 A1 Mar. 6, 2008

(30) Foreign Application Priority Data
Nov. 26, 2004 (NL) ...................... 1027600

(51) Int. Cl.
*B01F 3/04* (2006.01)
(52) U.S. Cl. .................... 261/91; 261/DIG. 71
(58) Field of Classification Search .......... 261/83, 261/84, 91, DIG. 71; 210/219, 765
See application file for complete search history.

(56) References Cited

U.S. PATENT DOCUMENTS

| | | | | |
|---|---|---|---|---|
| 3,648,989 A | * | 3/1972 | Friehe | 261/91 |
| 4,123,482 A | * | 10/1978 | Wyatt et al. | 261/91 |
| 4,193,951 A | * | 3/1980 | Stanley | 261/91 |
| 5,316,443 A | * | 5/1994 | Smith | 416/197 R |
| 5,522,989 A | | 6/1996 | Hove | |
| 6,877,959 B2 | * | 4/2005 | McWhirter | 416/228 |
| 6,986,507 B2 | * | 1/2006 | Weetman | 261/85 |
| 7,114,844 B2 | | 10/2006 | Weetman | |
| 7,296,925 B2 | * | 11/2007 | Himmelsbach et al. | 366/330.3 |
| 2004/0113290 A1 | * | 6/2004 | Weetman et al. | 261/91 |
| 2004/0174769 A1 | * | 9/2004 | Weetman | 366/328.3 |
| 2004/0217492 A1 | * | 11/2004 | Weetman et al. | 261/91 |

FOREIGN PATENT DOCUMENTS

| | | |
|---|---|---|
| JP | 2001062484 | 3/2001 |
| JP | 2002001379 | 1/2002 |
| JP | 2002018259 | 1/2002 |

OTHER PUBLICATIONS

European Search Report for co-pending International Application No. PCT/NL2005/000815; 2 pages, 2007.

* cited by examiner

*Primary Examiner* — Charles Bushey
(74) *Attorney, Agent, or Firm* — Meyertons, Hood, Kivlin, Kowert & Goetzel, P.C.; Eric B. Meyertons

(57) ABSTRACT

Apparatus for aerating waste water, provided with a container for waste water and a rotor which is rotatable about a substantially vertical axis (1) and the downward directed part of which can reach into the waste water, which rotor comprises blades (4) having surfaces which are orientated substantially radially and axially, wherein a surface (12) curved in the direction of rotation of the rotor is present close to the upper edge (8) of a blade (4), and wherein the curved surface close to the upper edge forms an angle of between 10° and 60° with the vertical plan of the blade.

8 Claims, 3 Drawing Sheets

APPARATUS AND METHOD FOR AERATING WASTE WATER

This application is a U.S. national phase filing, under 35 U.S.C. §371 of PCT Application No. PCT/NL2005/000815, filed on Nov. 28, 2005, which claims priority to Dutch Patent Application No. 1027600, filed on Nov. 26, 2004.

The invention relates to an apparatus for aerating waste water, provided with a container for waste water and a rotor which is rotatable about a substantially vertical axis and the downward directed part of which can reach into the waste water, which rotor comprises blades having surfaces which are oriented substantially radially and axially, wherein a surface curved in the direction of rotation of the rotor is present close to the upper edge of a blade. Such an apparatus is described in NL-A-9201782.

Such so-called surface aerators are often applied in an aerating tank of an active sludge installation and have the object of dissolving oxygen into the water and thereby provide the micro-organisms in the aerating tank with oxygen.

Oxygen transfer takes place substantially at the boundary surface between air and water, and an optimal oxygen transfer from air to water is achieved by making this boundary surface as large as possible. The oxygen transfer is further enhanced by keeping the oxygen content in the water close to the boundary surface as low as possible, since the higher the oxygen content of the water at the position of the boundary surface, the more difficult dissolving oxygen in water becomes. It is therefore important that the water close to the boundary surface is rapidly replaced.

The amount of energy necessary for the aeration forms the largest part of the energy consumption of a waste water treatment plant. It is therefore of great importance that the quantity of oxygen dissolved in the water per unit of energy (the oxygenation efficiency) is as high as possible.

The control of the oxygenation capacity of a surface aerator provided with a rotor which sets the water into motion takes place by changing the immersion depth and/or the rotation speed of the rotor. The immersion depth zone of the surface aerator must be sufficiently large to be able to cope with the normal variations in the water level of an aerating tank while maintaining a high oxygenation efficiency. The rotation speed range within which a high oxygenation efficiency is achieved must also be as large as possible, so that the highest possible oxygenation efficiency is obtained both when much oxygen is introduced and when less oxygen is introduced.

The invention has for its object a rapid decomposition of waste products in the water. The invention further has for its object a high and practically constant oxygenation efficiency over a wide immersion depth zone and a wide rotation speed range.

Another object of the invention is to develop sufficient flow rate and turbulence in the waste water so that the sludge is held in suspension and comes into contact with the dissolved oxygen.

The invention further has for its object to aerate waste water in a manner such that the generated forces remain limited, so that the installation can take a relatively light form.

Another object of the invention is to provide an apparatus for aerating waste water which is relatively insusceptible to contamination, particularly to the adhesion to the rotor of substances, materials and solid waste present in the waste water.

According to the invention the curved surface close to the upper edge forms an angle of between 10° and 60° with the vertical plane of the blade. The curved surface of the exemplary embodiment in NL-A-9201782 encloses an angle of 90° with the blades, although according to the description angles varying therefrom are also possible. Tests have however demonstrated that, by throwing the water being pushed up by the blades away at a large angle to the water surface, a higher degree of oxygen mixing is achieved, and therefore a greater biological activity and a more rapid decomposition of waste products. The curved surface close to the upper edge preferably encloses an angle with the vertical plane of the blade of between 20° and 40°, preferably about 30°.

The blades preferably do not extend exactly in radial direction, but the distance between the vertical plane of the blade and the radial extending parallel thereto from the axis of rotation of the rotor is between 0.01 and 0.10 times, more preferably about 0.04 times the diameter of the rotor. Tests have shown that placing the blades at an angle relative to the radial direction has a favourable effect on the oxygenation.

The transition between the blade and the curved part preferably has a radius which is at least 0.02 times, preferably at least 0.05 times, more preferably about 0.07 times the diameter of the rotor. In this way the speed of the pushed-up water is not reduced by an acute angle.

The height of the curved part is preferably between 0.03 and 0.10 times, more preferably about 0.05 times the diameter of the rotor.

The blades preferably consist at least partly of plate-like parts situated at a distance from the axis of rotation of the rotor, and in radial direction these parts have a width between 0.07 and 0.3 times the outer diameter of the rotor. The width of the blades can herein decrease in downward direction.

The blades are preferably mutually connected by a substantially horizontal plate-like part, close to the edge of which the blades are fixed. The blades can then extend on either side of said horizontal plate-like part, wherein the height of the blades is preferably between 0.05 and 0.3 times the outer diameter of the rotor.

The curved part can be formed integrally with the blade, but can also be a separate component which is fixed to the other part of the blade.

The invention also relates to a rotor for aerating waste water, which rotor comprises blades which are placed in a circle and which have surfaces which extend substantially radially and axially with an upper edge and a lower edge, wherein a surface curved in the direction of rotation of the rotor is present close to the upper edge of a blade.

The invention further relates to a method for aerating waste water, wherein the boundary surface between air and waste water is increased by splashing the water, and wherein the sludge in the waste water is held in suspension by creating flows and/or turbulence in the water, wherein the waste water is set into motion by moving through the waste water a number of blades disposed in a circle, which blades extend substantially radially and vertically, wherein the upper edge of a blade extends above the water surface, and wherein the water is carried upward by the speed of the blade and is then thrown away laterally relative to its direction of displacement by a surface of the blade which is oriented obliquely upward and curved in forward direction.

For the purpose of elucidation of the invention an exemplary embodiment of the rotor for aerating waste water will be described with reference to the figures, in which:

FIG. 1 is a perspective view of a biological treatment basin;
FIG. 2 is a front view of a first exemplary embodiment of a rotor;
FIG. 3 is a top view of the rotor of FIG. 2;
FIG. 4 is a front view of a blade of the rotor of FIG. 2;
FIG. 5 is a side view of the blade of FIG. 4;

Figure 1:
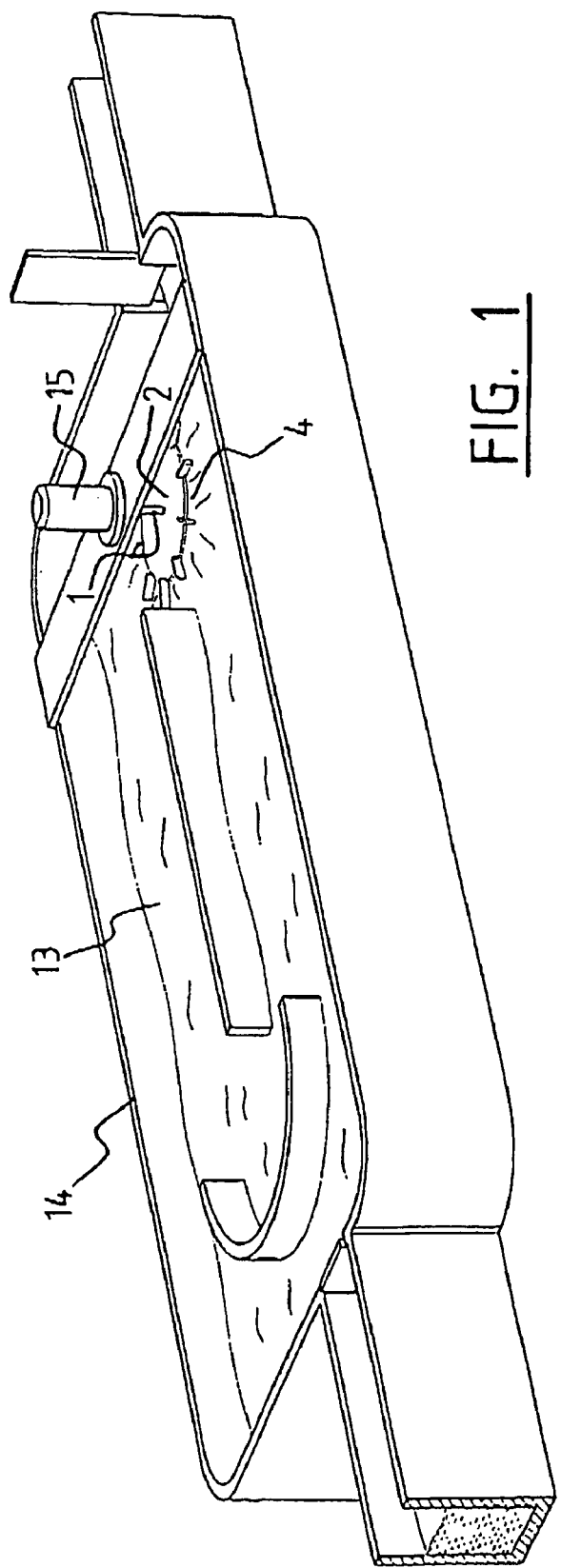
Figure 2:
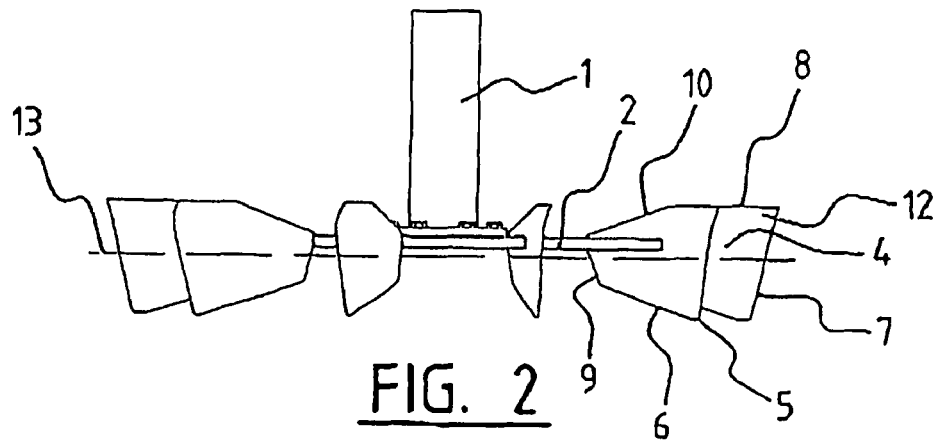
Figure 3:
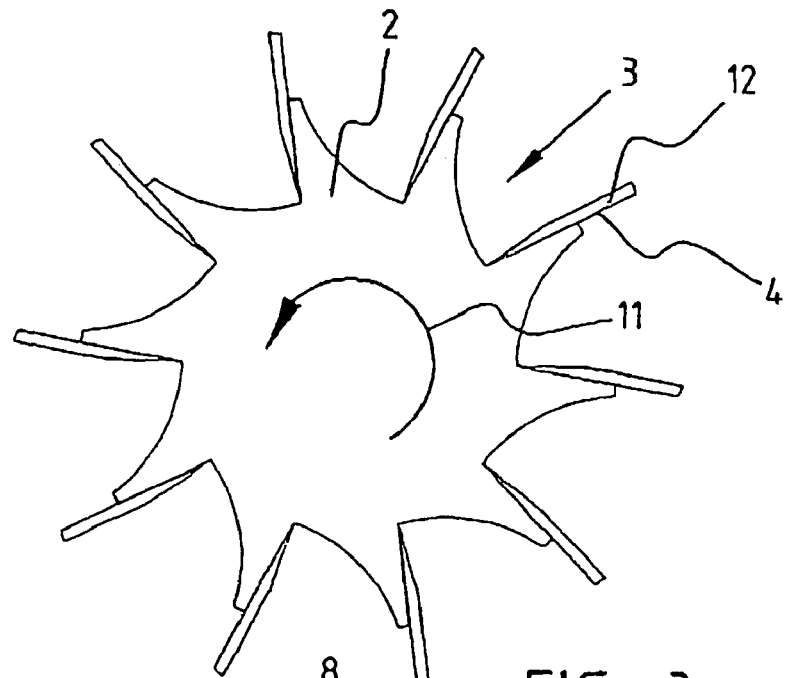

FIG. 1 shows a biological water treatment basin 14 which is filled with water having a water surface 13. Basin 14 as shown in FIG. 1 is a so-called bypass basin, although the invention also relates to other types of basin, such as square or round vessels or other forms of pool. A drive, for instance a motor 15, is disposed fixedly in basin 14, which motor 15 drives a shaft 1. The rotor comprises the centrally located vertical shaft 1 to the bottom of which is connected a plate 2 mounted perpendicularly thereof. A number of, in this embodiment ten, blades 4 extend substantially vertically and radially on the outer edge of plate 2. The rotor preferably rotates at a rotation speed such that the peripheral speed of the blades lies between 3 and 7 meters/second, more preferably between 4 and 6 meters/second, at which speeds the water will be pushed up and will splash upward. The rotor can otherwise also be utilized extremely well at a peripheral speed of between 1 and 3 meters/second as a mixing/stirring device for preventing sedimentation of sludge, for which purpose the shape of the parts of blades 4 extending under water is of particular importance.

Two embodiments of a rotor are shown in FIGS. 2-5 and 6-9. In both embodiments the rotor is provided with a centrally located vertical shaft 1 to which is connected a plate 2 mounted perpendicularly thereof. On the outer edge of plate 2 are arranged ten substantially triangular recesses 3 in which the blades 4 are situated.

Figure 4:
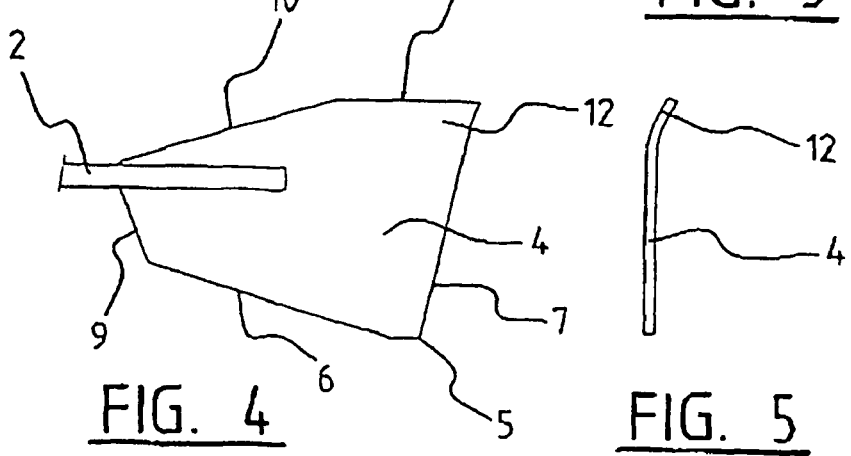
Figure 5:
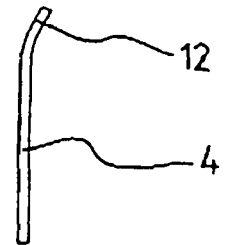
Figure 6:
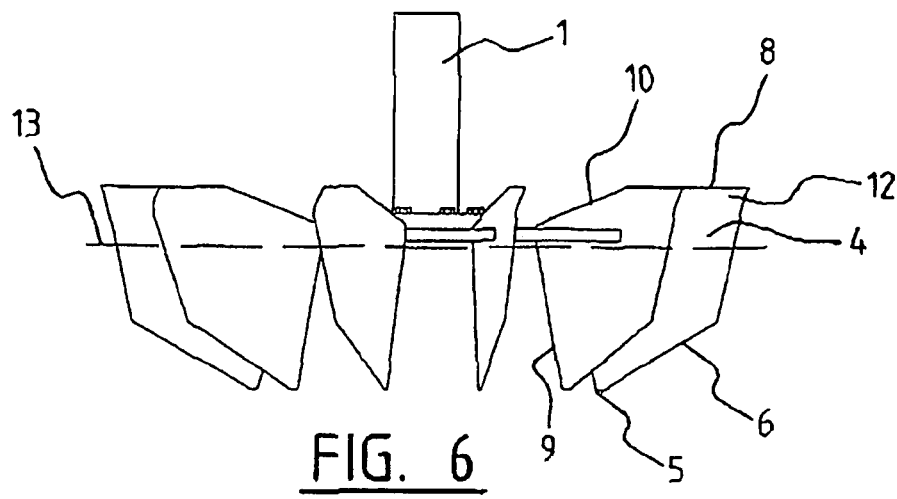
FIG. 6 is a front view of a second exemplary embodiment of a rotor.
Figure 7:
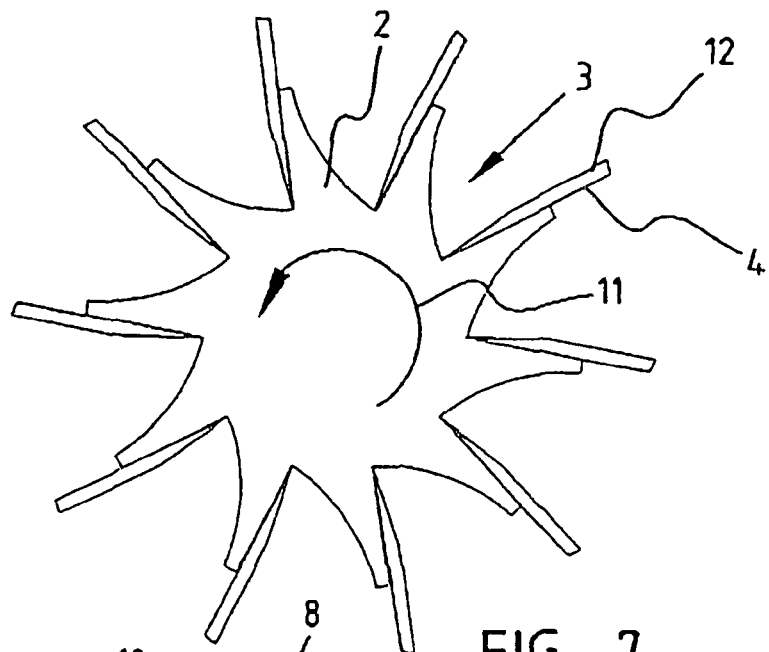
FIG. 7 is a top view of the rotor of FIG. 6.

Blade 4 according to FIG. 4 is plate-like and has a lowest point 5 close to the outer side of the rotor, an edge 7 running steeply upward and outward at an angle of 77.5 degrees and continuing above plate 2, an upper edge 8 which runs inward at an angle of 0 degrees and which transposes into an edge 10 which runs obliquely downward at an angle of 15 degrees as far as plate 2, an edge 9 which runs steeply downward and outward at an angle of 65 degrees from plate 2, and an edge 6 which runs outward and obliquely downward at an angle of 15 degrees to the lowest point 5.

Figure 8:
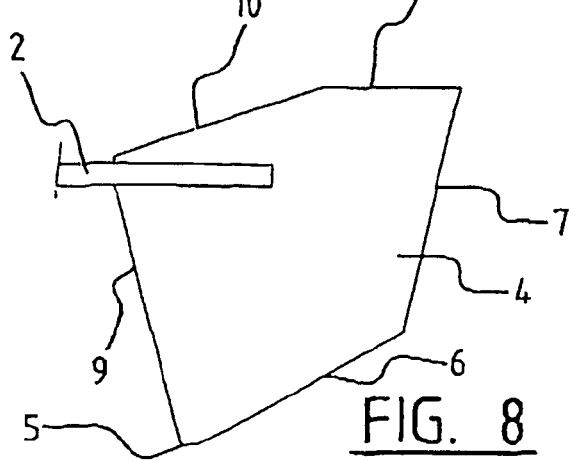
FIG. 8 is a front view of a blade of the rotor of FIG. 6.
Figure 9:
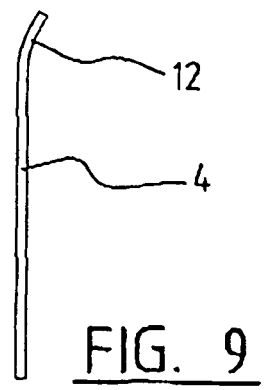
FIG. 9 is a side view of the blade of FIG. 8.

Blade 4 according to FIG. 8 is substantially the same as blade 4 according to FIG. 4, although compared thereto a substantially triangular plate-like part extends from the underside, i.e. from edge 6 in FIG. 4. The lowest point 5 hereby lies closer to the inner side of blade 4 and from this lowest point 5 the blade has an edge 6 which runs outward and obliquely upward at an angle of 30 degrees and which transposes into an edge 7 which runs steeply upward and outward at an angle of 77.5 degrees and which continues above plate 2, an upper edge 8 which runs inward at an angle of 0 degrees and which transposes into an edge 10 which runs obliquely downward at an angle of 15 degrees as far as plate 2, an edge 9 which runs steeply downward and outward from plate 2 at an angle of 75 degrees to the lowest point 5.

The distance between edge 8 and the plane of the underside of plate 2 is preferably 0.05 to 0.13 times the diameter of the rotor, and is in both preferred embodiments about 0.09 times the diameter of the rotor. Present close to the whole upper edge 8, in the direction of rotation 11 of the rotor, is a curved part 12 of which the surface close to the outer end, the upper edge 8, forms a certain angle with the vertical plane of blade 4, in the given preferred embodiments an angle of about 30°. This angle is preferably between 10° and 60°, more preferably it is between 20° and 40°. Curved part 12 is formed by bending the plate-like material from which blade 4 is manufactured in the direction of rotation of the rotor at edge 8, wherein the transition between blade 4 and curved part 12 has a radius which is preferably at least 0.02 times, more preferably about 0.07 times the diameter of the rotor. The height of curved part 12 is preferably between 0.03 and 0.10 times, more preferably about 0.05 times the diameter of the rotor.

Curved part 12 only extends along a part of the upper side, the outer part, of blade 4, preferably along 30%-70% thereof. This is achieved by the oblique edge 10. The water is hereby not deflected on the inner side of blade 4. Because the peripheral speed of the blade is lower on the inner side, this causes a better, wider splash pattern, whereby the efficiency of the rotor is improved.

Each blade 4 is placed parallel to, at a distance from and in front of the radial of the rotor as seen in the direction of rotation. The distance between the vertical plane of blade 4 and the radial extending parallel thereto from the axis of rotation of the rotor is preferably between 0.01 and 0.10 times, more preferably about 0.04 times the diameter of the rotor.

The lower parts of blades 4 of the rotor reach into the waste water and, by rotating the rotor as indicated with arrow 11, the waste water is set into motion. This creates an upward directed flow against blade 4, wherein the flow is deflected at a certain angle by curved part 12. The water falls back into waste water 13 at a distance from the blade. This creates turbulence, wherein air bubbles are formed whereby a strong boundary surface replacement of the water occurs.

The form of the rotor with blades 4 is such that the lower part of the blades reaches into waste water 13, while plate-like part 2 which connects blades 4 to each other and to the rotor is situated just below the surface of waste water 13. Due to the water pressure on the underside of the plate a guided water flow is obtained in the waste water, whereby a calm and low-vibration movement of the rotor is achieved. Compared to a rotor where plate 2 is situated above water surface 13, the water cannot splash periodically against the underside of the plate and over it, also referred to as cadence, which results in great varying forces on the drive. Due to the rotation of the rotor the water is churned up and pushed up in front of blades 4, wherein the water can escape upward through recesses 3 and the water can be brought into good contact with the air, while the upward pressure on plate 2 and the bearing and the gear box of drive 15 remains limited.

The rotor is not susceptible to contamination and is self-cleaning due to the arrangement and form of the blades. The oblique edge 9 particularly contributes toward the self-cleaning capacity of the rotor.

The invention is of course not limited to the shown exemplary embodiment. In addition to many other variations, it is possible to make the angle the edge 8 of blade 4 forms with plate 2 different for all or for some of the blades 4. A greater distribution in the distance the water is thrown out from the rotor is hereby achieved. The direction of blades 4 relative to shaft 1 can also be given a different form. The blades 4 varying slightly from the radial in the shown exemplary embodiment can also have a different position varying from the radial direction. The blades herein do not all have to occupy the same position, but can be oriented differently so as to achieve an optimal effect. The above described aspects of the rotor can further be deemed as separate inventions per se or in diverse combinations.

The invention claimed is:

1. Apparatus for aerating waste water, comprising a container for waste water and a rotor which is rotatable about a substantially vertical axis, wherein the downward directed part of the rotor is configured to reach into the waste water, wherein the rotor comprises blades having surfaces which are oriented substantially radially and vertically, wherein one or more blades comprise a straight main part and a straight upper edge part, wherein the straight main part is oriented parallel to the vertically aligned rotor axis, and wherein the straight upper edge part is oriented at an angle of between 10° and 60° with respect to the straight main part; and wherein the rotor is positioned in the container such that at least a portion of the straight upper edge part of one or more blades extends above the water surface, and wherein the transition between the straight main part and the straight upper edge part is curved, and wherein the curved transition region has a radius which is at least 0.02 times the diameter of the rotor.

2. Device as claimed in claim 1, wherein the straight upper edge part is oriented at an angle of between 20° and 40° with respect to the straight main part.

3. Device as claimed in claim 1, wherein the distance between the vertical plane of the blade and a radial line extending parallel thereto from the axis of rotation of the rotor is between 0.01 and 0.10 times the diameter of the rotor.

4. Device as claimed in claim 1, wherein the height of the straight upper edge part is between 0.03 and 0.10 times the diameter of the rotor.

5. Device as claimed in claim 1, wherein the straight upper edge part only extends along an outer part of the upper side of the blade.

6. Rotor for aerating waste water, which rotor comprises blades which are placed in a circle and which have surfaces which extend substantially radially and vertically with an upper edge and a lower edge, wherein one or more blades comprise a straight main part and a straight upper edge part, wherein the straight main part is oriented parallel to the vertically aligned rotor axis, and wherein the straight upper edge part is angled, with respect to the straight main part in the direction of rotation of the rotor, and wherein the straight upper edge part is oriented at an angle of between 10° and 60° with respect to the straight main part; and wherein at least a portion of the straight upper edge part of one or more blades extends above the water surface, and wherein the transition between the straight main part and the straight upper edge part is curved, and wherein the curved transition region has a radius which is at least 0.02 times the diameter of the rotor.

7. Method for aerating waste water, wherein the boundary surface between air and waste water is increased by splashing the water, wherein the method comprises:
creating flows and/or turbulence in the water such that the sludge in the waste water is held in suspension, wherein the waste water is set into motion by moving through the waste water a number of blades disposed in a circle, which blades extend substantially radially and vertically from the rotor, wherein one or more blades comprises a straight main part and a straight upper edge part, wherein the straight main part is oriented parallel to the vertically aligned rotor axis, and wherein at least a portion of the straight upper edge part of one or more blades extends above the water surface, and wherein the water is carried upward by the speed of the blade and is then thrown away laterally relative to its direction of displacement by the straight upper edge part of the blade which is oriented obliquely upward in a forward direction, wherein the straight upper edge part is oriented at an angle of between 10° and 60° with respect to the straight main part, and wherein the transition between the straight main part and the straight upper edge part is curved, and wherein the curved transition region has a radius which is at least 0.02 times the diameter of the rotor.

8. Method as claimed in claim 7, wherein the rotor rotates at a rotation speed such that the peripheral speed of the blades lies between 3 and 7 meters/second.

\* \* \* \* \*